United States Patent
Hirooka

(10) Patent No.: US 9,924,101 B2
(45) Date of Patent: Mar. 20, 2018

(54) IMAGE CAPTURING APPARATUS INCLUDING RELEASE MEMBER, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Shigeki Hirooka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 14/667,775

(22) Filed: Mar. 25, 2015

(65) Prior Publication Data
US 2015/0281584 A1 Oct. 1, 2015

(30) Foreign Application Priority Data

Apr. 1, 2014 (JP) ................... 2014-075724

(51) Int. Cl.
H04N 5/222 (2006.01)
H04N 5/228 (2006.01)
H04N 5/232 (2006.01)

(52) U.S. Cl.
CPC .............. *H04N 5/23293* (2013.01)

(58) Field of Classification Search
CPC ........... H04N 5/23245; H04N 5/23248; H04N 5/2351; H04N 5/2353; H04N 5/2354; H04N 5/243; H04N 5/23293
See application file for complete search history.

(56) References Cited

U.S. PATENT DOCUMENTS

2009/0244317 A1* 10/2009 Makii ................ H04N 5/23245
348/229.1
2017/0054839 A1* 2/2017 Ishikawa ........... H04W 52/0274

FOREIGN PATENT DOCUMENTS

| JP | 2000-020205 A | 1/2000 |
|----|---------------|--------|
| JP | 2000-222185 A | 8/2000 |
| JP | 2009-296326 A | 12/2009 |
| JP | 2009-302931 A | 12/2009 |

OTHER PUBLICATIONS

Japanese Office Action dated Jan. 4, 2018 in corresponding Japanese Patent Application No. 2014-075724 together with English translation, 6 pages.

* cited by examiner

*Primary Examiner* — Twyler Haskins
*Assistant Examiner* — Carramah J Quiett
(74) *Attorney, Agent, or Firm* — Carter, DeLuca, Farrell & Schmidt, LLP

(57) ABSTRACT

The apparatus displays a standard image capturing screen for capturing an image using a first image capturing unit in the case where an operation of a release member has been detected while a standard playback screen for performing playback using a first playback unit is being displayed, and, in the case where an operation of the release member has been detected while a predetermined image capturing screen for capturing an image using a second image capturing unit is not being displayed and a screen of the predetermined application is being displayed, displays the predetermined image capturing screen.

13 Claims, 16 Drawing Sheets

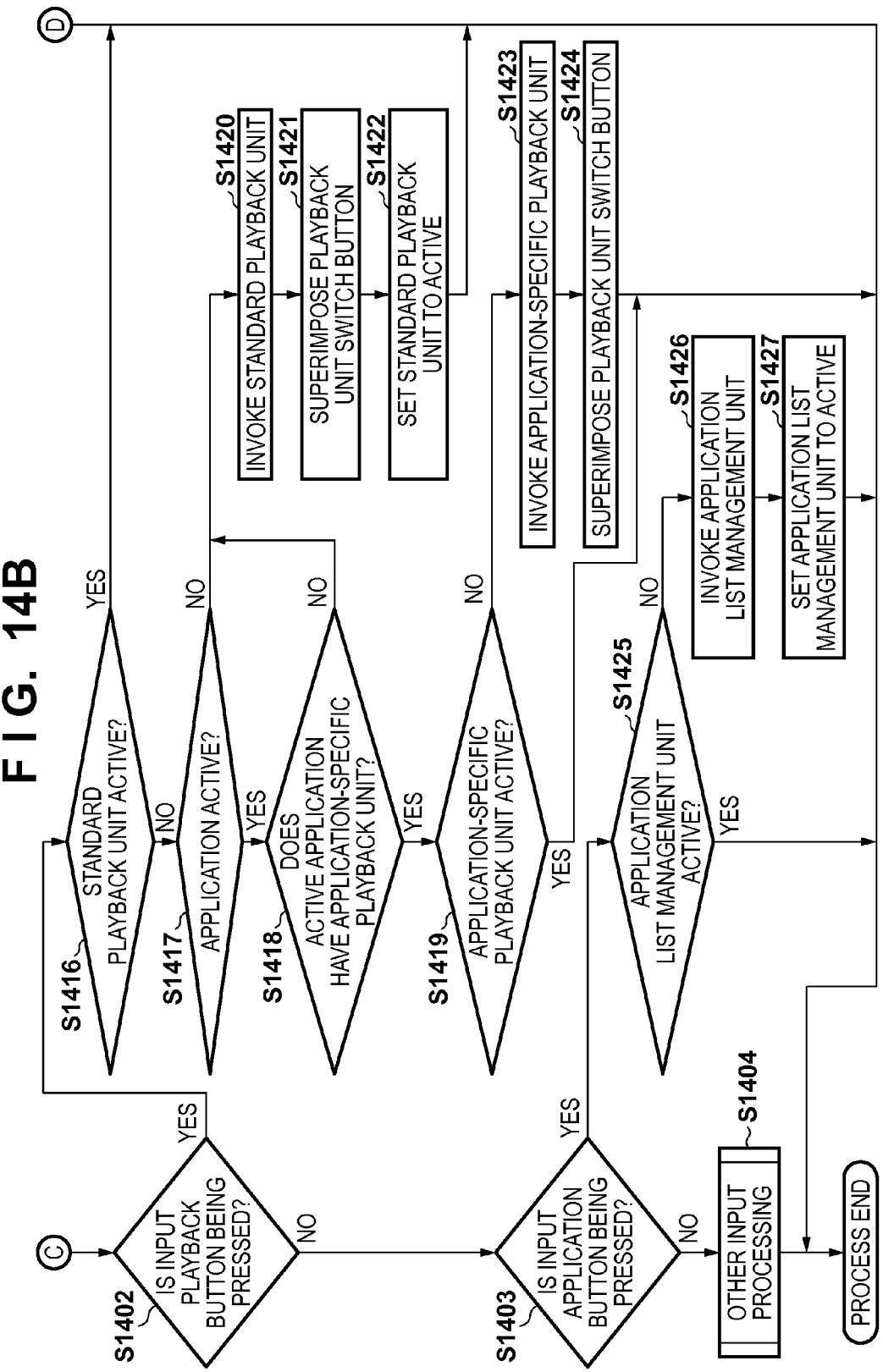

IMAGE CAPTURING APPARATUS INCLUDING RELEASE MEMBER, CONTROL METHOD THEREOF, AND NON-TRANSITORY COMPUTER-READABLE STORAGE MEDIUM

BACKGROUND OF THE INVENTION

Field of the Invention

The present invention relates to image capturing apparatuses capable of having one or more applications installed, control methods for such image capturing apparatuses, and non-transitory computer-readable storage media.

Description of the Related Art

Conventional image capturing apparatuses typically have two standard image capturing apparatus means, namely image capturing and playback, as well as a means for invoking the respective means. Here, the standard image capturing means and playback means refer to an image capturing means and a playback means provided in the image capturing apparatus even when there are no additional applications. The standard image capturing means is typically invoked when the power is turned on, by pressing a switch that instructs an image to be captured, and so on.

Meanwhile, recent years have seen the spread of what are called smartphones, which are communication devices that realize various means by including multiple application programs, in the same manner as computers. A smartphone typically has an application list screen (a home screen) for listing and invoking a variety of applications, as well as a means for invoking the application list screen. Many smartphones also have image capturing means, and such image capturing means are typically invoked from the application list screen as an application. Some smartphones include multiple image capturing applications having different means, and in such a case, the method for invoking the image capturing means often differs depending on the application. Meanwhile, when the user invokes the image capturing means, it is necessary for the user to select which image capturing means to use. However, when capturing an image, selecting the desired image capturing means from among many image capturing means each time is complicated.

To alleviate this complexity, a terminal apparatus that detects an operating mode during operation and invokes an image capturing means based on the operating mode has been proposed in the past (for example, Japanese Patent Laid-Open No. 2009-296326). In addition, an information processing apparatus that makes it possible to invoke an image capturing means using a single button operation while another application is being used has also been proposed (for example, Japanese Patent Laid-Open No. 2000-20205).

However, in order to capture an image in the aforementioned conventional smartphones, it has been necessary to select the standard image capturing means from among multiple applications after first changing the screen to the application list screen. Likewise, in order to play back a captured image in a conventional smartphone, it has been necessary to select the standard playback means from among multiple applications after first changing the screen to the application list screen, aside from exceptions such as when invoking a playback screen from an image capturing screen. Not only are such operations complicated for the user, but can also result in the user missing a chance for a good shot when attempting to capture an image. Meanwhile, in conventional smartphones, the operations for invoking the image capturing/playback means differ depending on the application, and it is thus possible that the user will mistakenly invoke an unwanted image capturing means/playback means and will miss a chance for a good shot as a result.

In the case where the image capturing means is selected/invoked in accordance with the current operating mode as in Japanese Patent Laid-Open No. 2009-296326, it is necessary for the terminal apparatus to update an operating mode list for the image capturing functions when adding an application. Accordingly, it has been difficult to maintain consistency in the operating mode list in the case where applications are provided from multiple sources.

Finally, in the case where the image capturing means is invoked through a single button operation as in Japanese Patent Laid-Open No. 2000-20205, if the information processing apparatus includes an application having multiple image capturing means, the image capturing means suitable for an active application cannot be invoked. The "active application" refers to an application running in the foreground, or in other words, an application that is displayed at the front of a display device and that is subject to delivery of input events from the user. Furthermore, in the case where the information processing apparatus includes an application having multiple image capturing/playback means, invoking an image capturing/playback means of a given application when another specific image capturing/playback means is running has required multiple procedures, and has thus been complicated.

SUMMARY OF THE INVENTION

Having been achieved in light of the aforementioned problems, the present invention makes it possible to invoke an appropriate image capturing means/playback means based on a user's usage state.

According to one aspect of the present invention, there is provided an image capturing apparatus comprises: a release member; a first image capturing unit configured to capture an image using a standard image capturing function; a first playback unit configured to play back a captured image using a standard playback function; a second image capturing unit configured to capture an image using a predetermined application; and a display control unit configured to display a standard image capturing screen for capturing an image using the first image capturing unit in the case where an operation of the release member has been detected while a standard playback screen for performing playback using the first playback unit is being displayed, and, in the case where an operation of the release member has been detected while a predetermined image capturing screen for capturing an image using the second image capturing unit is not being displayed and a screen of the predetermined application is being displayed, display the predetermined image capturing screen.

Further features of the present invention will become apparent from the following description of exemplary embodiments (with reference to the attached drawings).

BRIEF DESCRIPTION OF THE DRAWINGS

FIGS. 14A and 14B are flowcharts illustrating an example of an input process according to the second embodiment.

DESCRIPTION OF THE EMBODIMENTS

Figure 1:
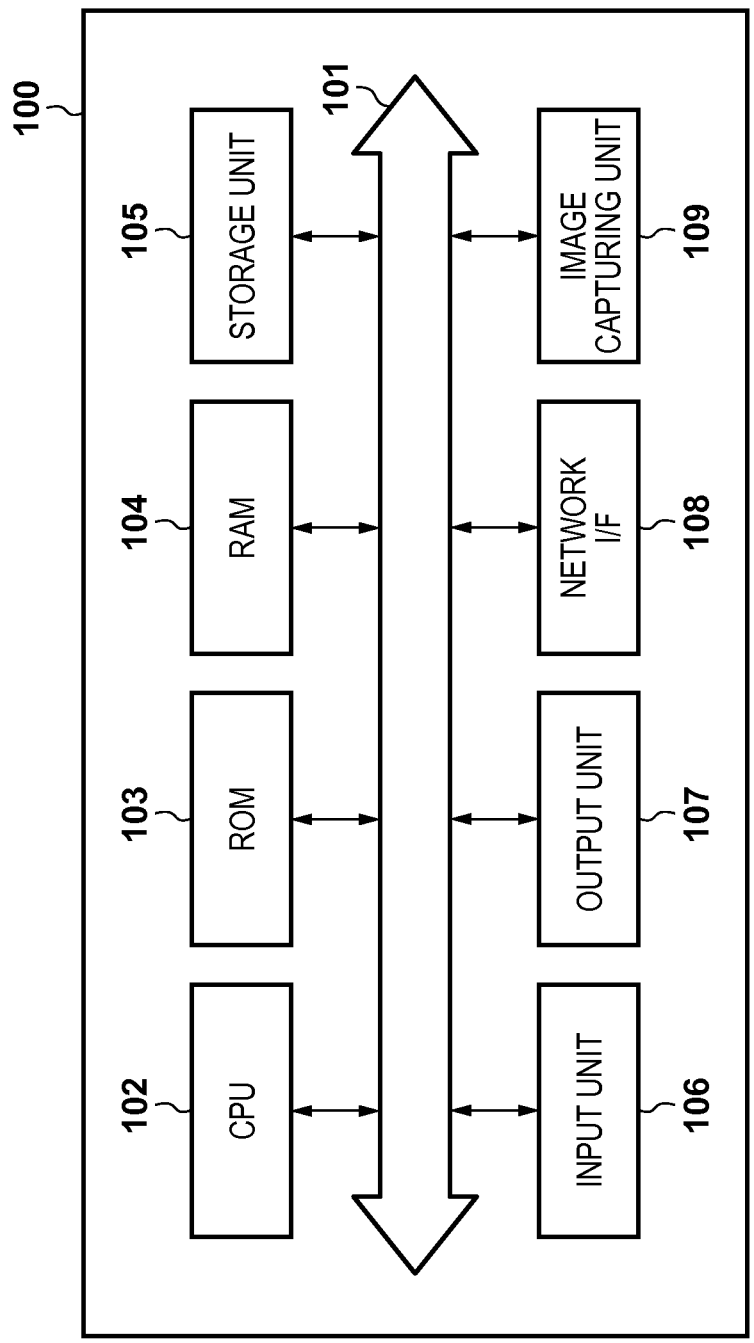
FIG. 1 is a block diagram illustrating an example of the hardware configuration of an image capturing apparatus according to an embodiment.

Some embodiments of the present invention will be described hereinafter in detail with reference to the appended drawings. It should be noted that the configurations described in the following embodiments are merely examples, and that the present invention is not intended to be limited to the configurations described therein and illustrated in the drawings.

First Embodiment

FIG. 1 is a block diagram illustrating an example of the hardware configuration of an image capturing apparatus according to the present embodiment. Overall hardware 100 of the image capturing apparatus is configured of a system bus 101, a central processing unit ("CPU" hereinafter) 102, a ROM 103, a RAM 104, a storage unit 105, an input unit 106, an output unit 107, a network I/F 108, and an image capturing unit 109. The CPU 102 carries out computations and logical determinations for various types of processes that will be mentioned later, and controls the respective constituent elements connected to the system bus 101, which serves to exchange data, commands, and so on. A memory, including a program memory and a data memory, is installed in this apparatus. Programs for control carried out by the CPU 102, including processing procedures illustrated later in flowcharts, are stored in the program memory. The program memory may be the ROM 103, or may be the RAM 104 into which programs are loaded from the storage unit 105 or the like. The storage unit 105 is a storage device, such as a flash memory or the like, for storing data, programs, and so on according to the present embodiment.

An input operation for information or other operations are carried out by a user through the input unit 106. The output unit 107 is a display including output circuitry such as a graphics controller, a speaker, or the like. This image capturing apparatus uses a touch panel that combines the input unit 106 with the output unit 107, and thus various types of operations such as invoking applications are carried out in an application list screen. The network I/F 108 is an interface used for connecting to an external network. The network I/F 108 may be a modem for connecting to an external network, or may be an adapter for connecting to a wireless LAN (local area network), a public wireless telephone line, Bluetooth (registered trademark), or the like. It is assumed that the apparatus can connect to a server (not shown) via the network I/F 108. The image capturing unit 109 includes a lens, an image sensor such as a CMOS, various types of sensors, image processing circuits, and so on, and captures an image of a subject.

Figure 2:
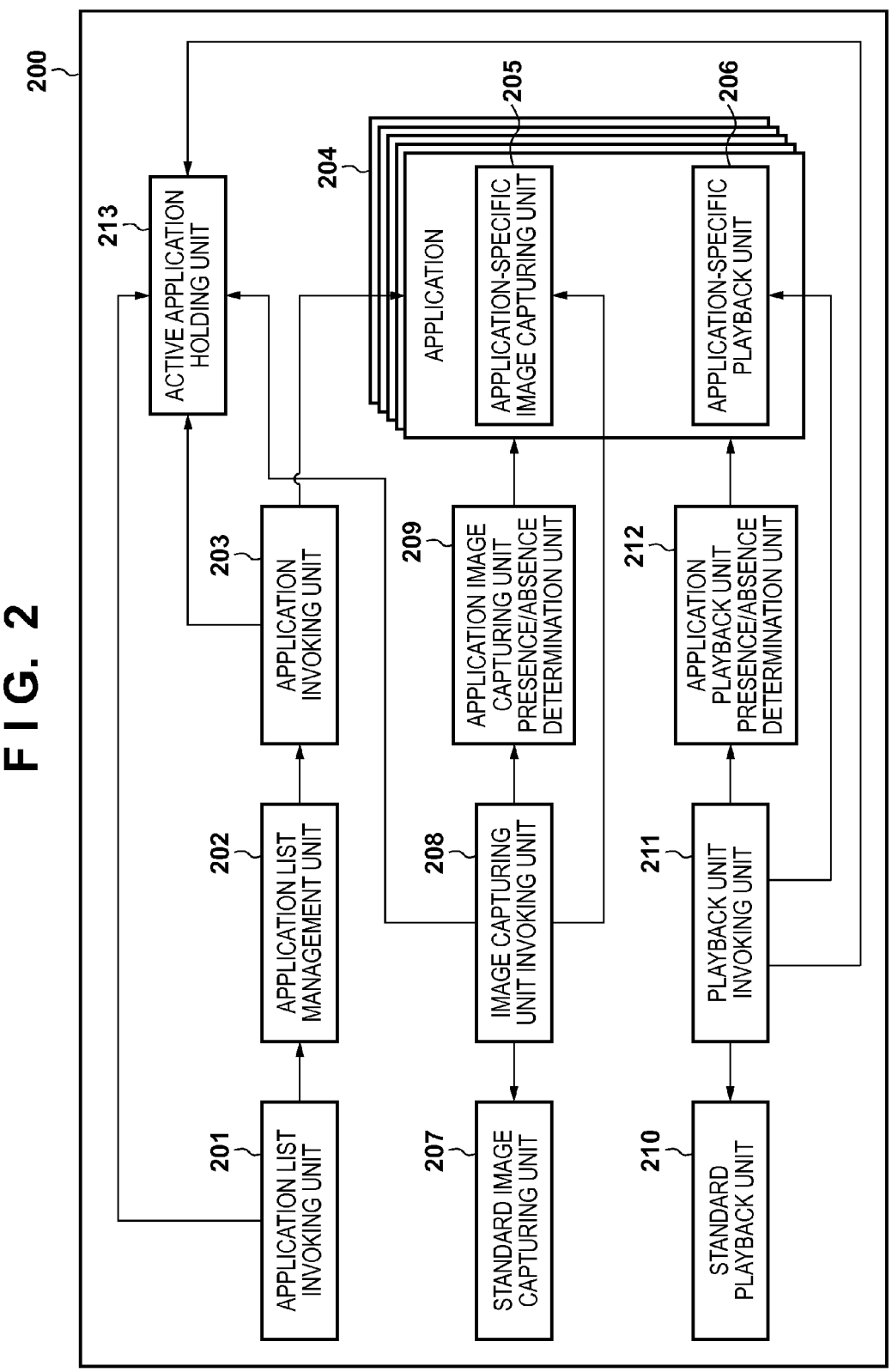
FIG. 2 is a block diagram illustrating an example of the configuration of the image capturing apparatus according to the embodiment.

FIG. 2 is a block diagram illustrating an example of the configuration of an image capturing apparatus 200 according to the present embodiment. In FIG. 2, an application list invoking unit 201 invokes an application list management unit 202, indicating the applications installed in the image capturing apparatus, in response to a user instruction. The application list management unit 202 displays a list of applications, and launches applications, manages applications, and so on. An application invoking unit 203 invokes a specific application from among usable applications installed in the image capturing apparatus. In the case where an application is not running when it is invoked by the application invoking unit 203, the application is launched, whereas in the case where the application is already running, the application is brought to the foreground. Installed applications 204 are interactive applications, making outputs to the user through a display screen using output unit 107 and accepting inputs from the user using the input unit 106 that is configured of buttons, a touch panel, or the like. As illustrated in FIG. 2, multiple applications can be installed in the image capturing apparatus 200, and it is also possible to add (install) applications after the apparatus has been manufactured and shipped. Some applications are provided by the manufacturer of the image capturing apparatus, and some applications are provided by third parties.

An application-specific image capturing unit 205 carries out special application-specific image capturing. The "special application-specific image capturing" refers to image capturing specific to a given application, such as image capturing for capturing a panoramic image, image capturing for capturing a night scene by reducing noise through composite processing and automatic stabilization functions, and so on. The application-specific image capturing unit 205 may execute image capturing that automatically carries out image processing on a captured image, such as processing the captured image to appear as a drawing, processing the captured image to appear as a cartoon, or the like.

An application-specific playback unit 206 carries out special application-specific image playback. Some of the applications 204 include both the application-specific image capturing unit 205 and the application-specific playback unit 206, whereas some include only one of these units and some include neither of these units. A standard image capturing unit 207 carries out standard image capturing for the image capturing apparatus, which is not specific to an application. The standard image capturing unit 207 captures images using a standard image capturing function installed in advance in the image capturing apparatus 200 at the time of manufacture/shipping. Although the standard image capturing unit 207 is described as capturing images independent from applications, this image capturing may be carried out using an application specifically for standard image capturing. In this case, the application for capturing images using the standard image capturing function may be added (installed) after the apparatus has been shipped.

An image capturing unit invoking unit 208 invokes a specific image capturing unit in response to a user instruction. An application image capturing unit presence/absence determination unit 209 determines whether or not an application includes an image capturing unit. A standard playback unit 210 carries out standard image playback for the image capturing apparatus, which is not specific to an application. A playback unit invoking unit 211 invokes a specific image playback unit in response to a user instruction. An application playback unit presence/absence determination unit 212 determines whether or not an application includes an image playback unit.

An active application holding unit 213 holds information of a currently-active application (an application identifier, for example). Here, "active application" refers to an application that is running in the foreground and that is subject to delivery of input events from the user. In other words, an "active application" is an application to be operated by the user. Note that the application list management unit 202, the standard image capturing unit 207, and the standard playback unit 210 are not applications, but have unique identifiers. As such, the identifiers of these units are set in the active application holding unit 213 when the units are active, which makes it possible to determine what is active at that point in time.

Figure 3:
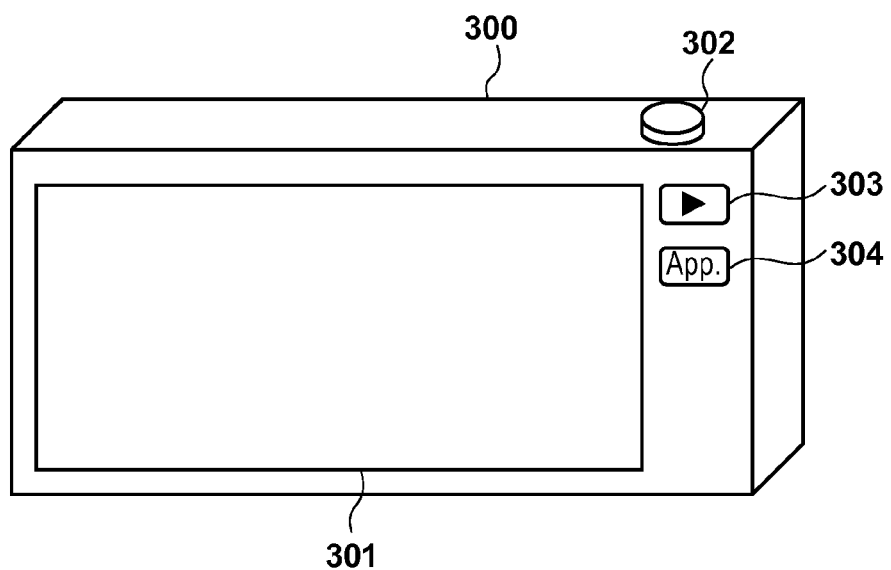
FIG. 3 is a conceptual diagram illustrating an example of the exterior of the image capturing apparatus according to the embodiment.

FIG. 3 is a conceptual diagram illustrating an example of an exterior 300 of the image capturing apparatus according to the present embodiment. In FIG. 3, the exterior 300 of the image capturing apparatus is configured of a display unit 301, a release button 302, a playback button 303, and an application button 304. The display unit 301 is part of the output unit 107 illustrated in FIG. 1. The display unit 301 displays a viewfinder image when capturing an image, a playback image when playing back images that have been captured, an application list, various screens when applications are run, various types of settings screens and menus, and the like. The display unit 301 is integrated with a touch panel, and thus various types of operations can be made by the user touching the screen. The release button 302 is a button for capturing an image. Note that the release button 302 is configured as a hardware member, and is capable of detecting a pressing operation performed by the user. The release button may also be referred to as a shutter button, an image capturing button, or the like. In the present embodiment, when pressed, the release button 302 instructs an image to be captured when in the image capturing screen and instructs a change to the image capturing screen when in another screen. The playback button 303 is a button for receiving a playback instruction from the user and instructing a change to a playback screen. The application button 304 is a button for accepting an instruction from the user and instructing a change to the application list screen.

Figure 4:
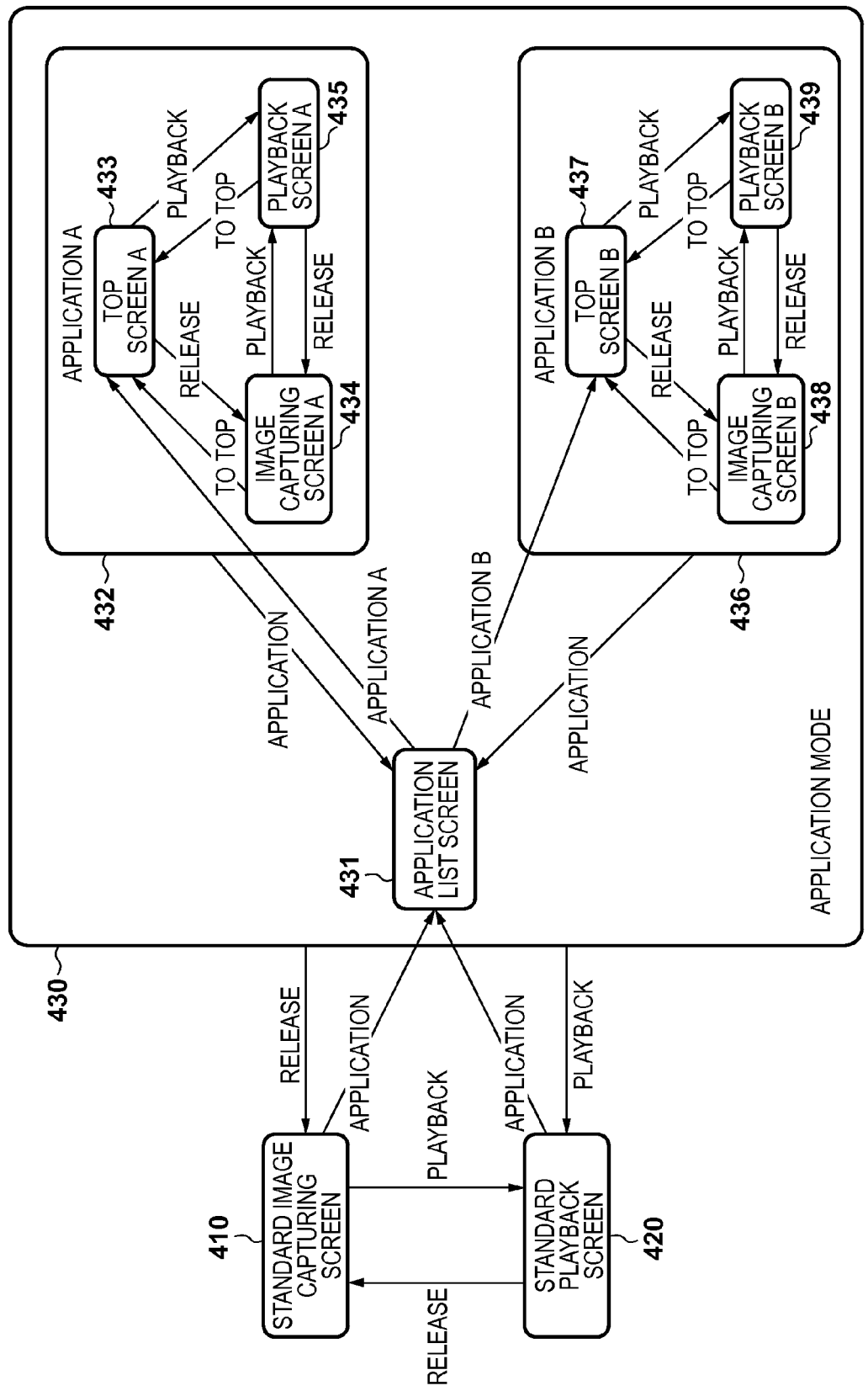
FIG. 4 is a conceptual diagram illustrating an example of a screen change chart of the image capturing apparatus according to a first embodiment.

FIG. 4 is a conceptual diagram illustrating an example of a screen change chart of the image capturing apparatus according to the present embodiment. A standard image capturing screen 410 is a screen of the image capturing apparatus that includes the viewfinder image for capturing an image. A standard playback screen 420 is a screen of the image capturing apparatus for playing back captured images. An application mode 430 includes an application list screen 431, an application A 432, and an application B 436. The application mode 430 is not an actual screen, but is rather a conceptual presence that includes the application list screen 431 and screens for the individual applications 432 and 436.

The application list screen 431 is a screen that displays, in the display unit 301, a list of the applications 204 installed in the image capturing apparatus. The application list screen 431 is also a screen that, when the user taps any one of the displayed applications, can invoke the application that has been tapped. The application A 432 is one application invoked from the application list. The application A 432 includes multiple screens, but the screens are merely conceptual presences and do not refer to specific screens. A top screen A 433 is a top screen displayed when the application A 432 is launched. An image capturing screen A 434 is an image capturing screen in the application A 432. A playback screen A 435 is an image playback screen in the application A 432. The application B 436, as well as a top screen B 437, an image capturing screen B 438, and a playback screen B 439 included in the application B 436, are the same as the application A 432, the top screen A 433, the image capturing screen A 434, and the playback screen A 435, respectively.

When, in the standard image capturing screen 410, the playback button 303 is pressed by the user, the screen changes to the standard playback screen 420, and when the application button 304 is pressed by the user, the screen changes to the application list screen 431. Likewise, when, in the standard playback screen 420, the release button 302 is pressed by the user, the screen changes to the standard image capturing screen 410, and when the application button 304 is pressed by the user, the screen changes to the application list screen 431. Meanwhile, when, in any of the screens in the application mode 430, the release button 302 is pressed by the user, the screen changes to the standard image capturing screen 410, and when the playback button 303 is pressed by the user, the screen changes to the standard playback screen 420. However, in the case where a screen change is indicated by a specific button in an individual screen, that indicated screen change is prioritized over the changes defined in the overall application mode 430. When, in the application list screen 431, the application A 432 displayed in the display unit 301 is tapped by the user, the screen changes to the top screen A 433; likewise, when the application B 436 is tapped by the user, the screen changes to the top screen B 437.

Meanwhile, when, in any screen in the application A 432 and the application B 436, the application button 304 is pressed by the user, the screen changes to the application list screen 431. When, in the application A 432, the release button 302 is pressed by the user, the screen changes to the image capturing screen A 434, and when the playback button 303 is pressed by the user, the screen changes to the playback screen A 435. When a button (not shown) in the display unit 301 is pressed by the user, the screen changes to the top screen A 433. Likewise, when, in the application B 436, the release button 302 is pressed by the user, the screen changes to the image capturing screen B 438, and when the playback button 303 is pressed by the user, the screen changes to the playback screen B 439. When a button (not shown) in the display unit 301 is pressed by the user, the screen changes to the top screen B 437.

Figure 5:
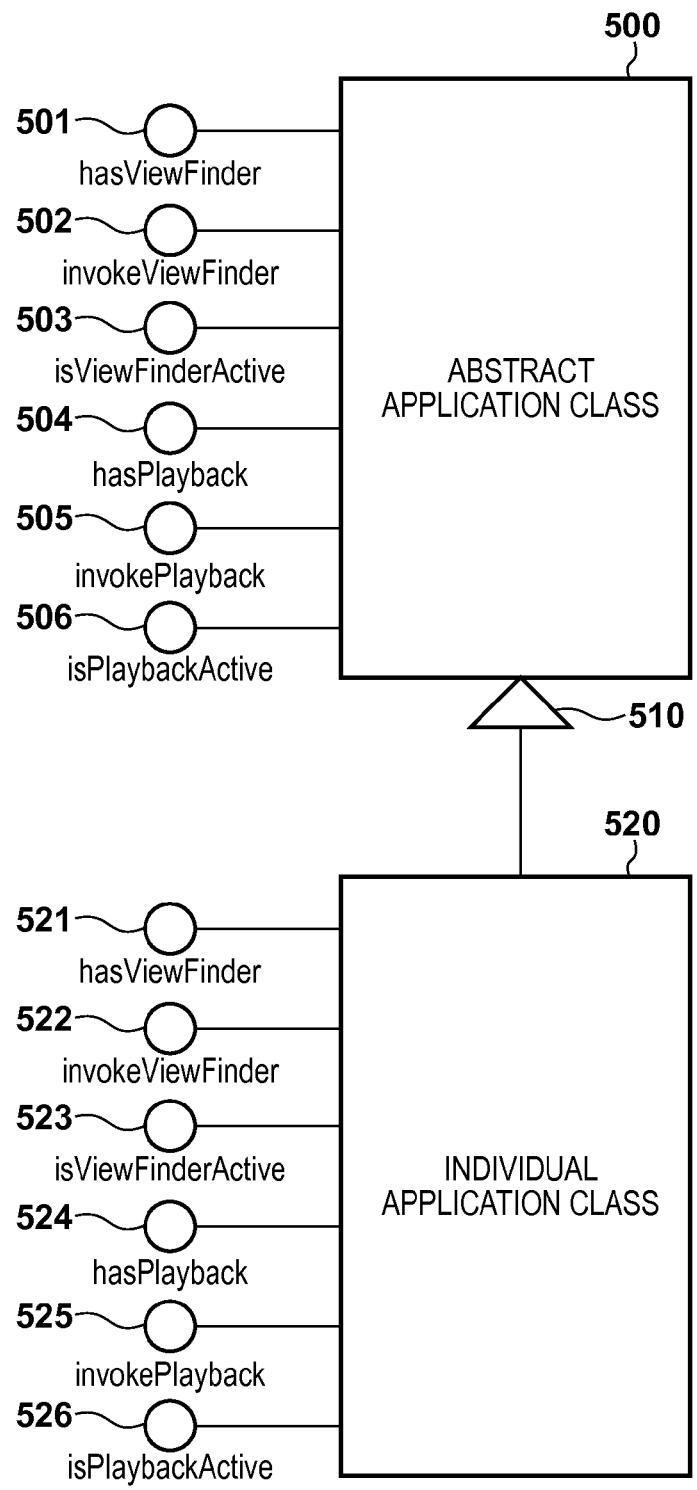
FIG. 5 is a class diagram according to UML for applications according to the embodiment.

FIG. 5 is a class diagram according to UML for applications according to the present embodiment. In FIG. 5, an abstract application class 500 is a class that serves as a template for creating individual application classes by itself being inherited. An individual application class 520 is an individual class that inherits the abstract application class 500. Reference numeral 510 indicates that the individual application class 520 is inheriting the abstract application class 500.

Interfaces 501 to 506 are interfaces held by the abstract application class 500, whereas interfaces 521 to 526 are interfaces held by the individual application class 520. These interfaces provide specific functions by being invoked from the exterior. The interfaces 501 and 521 have a function for returning whether or not the application has an image capturing function. The interfaces 502 and 522 have a function for invoking the image capturing function of an application. The interfaces 503 and 523 have functions for returning whether or not the image capturing function is active when the interface is invoked, in the case where the application has an image capturing function. The interfaces 504 and 524 have a function for returning whether or not the application has an image playback function. The interfaces 505 and 525 have a function for invoking the image playback function of an application. The interfaces 506 and 526 have functions for returning whether or not the image playback function is active when the interface is invoked, in the case where the application has an image playback function.

All of the individual applications that inherit the abstract application class 500 can confirm the presence/absence of and invoke the image capturing/image playback functions by invoking the same interfaces as the abstract application class 500. In the abstract application class 500, the interfaces 501 and 504 return default values of false, or in other words, responses indicating that neither the image capturing function nor the image playback function is present. Meanwhile, the interfaces 502 and 504 do nothing as default values, and return a processing failure. The interfaces 503 and 506 return default values of false, or in other words, responses indicating that neither the image capturing function nor the image playback function is active.

The interfaces 521 to 526 of the individual application class are the result of the individual application class 520 overwriting the interfaces of the abstract application class 500 as necessary. In other words, in the case where an individual application includes the image capturing/image playback functions, the interfaces 521 and 524 are implemented and a value of true is returned. In addition, an individual application implements the interfaces 523 and 526, and returns whether or not the image capturing/image playback function is active when the interface is invoked. Finally, an individual application implements the interfaces 522 and 525 so as to invoke the image capturing/image playback function specific to that application.

Figure 6A:
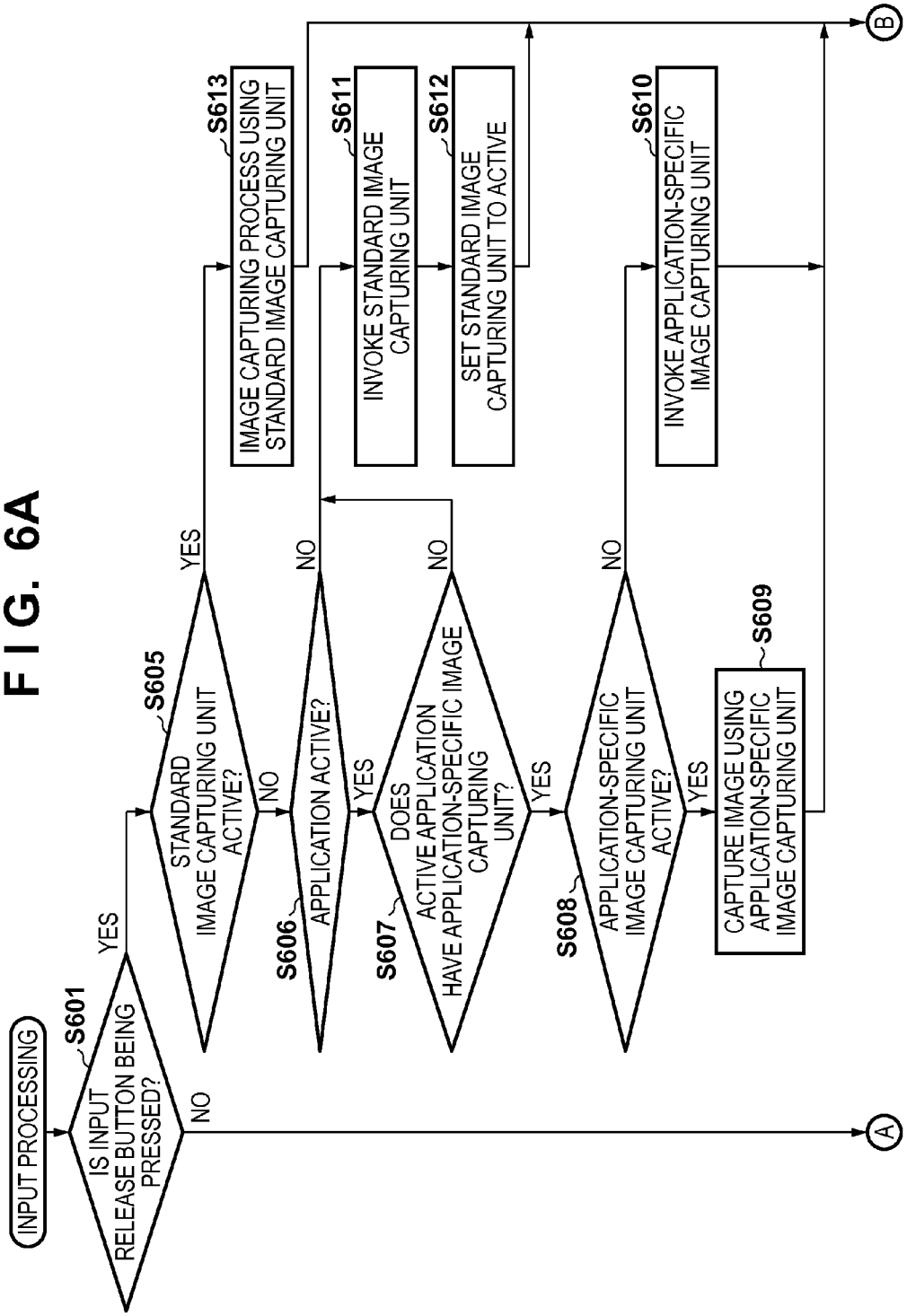
FIGS. 6A and 6B are flowcharts illustrating an example of an input process according to the first embodiment.
Figure 6B:
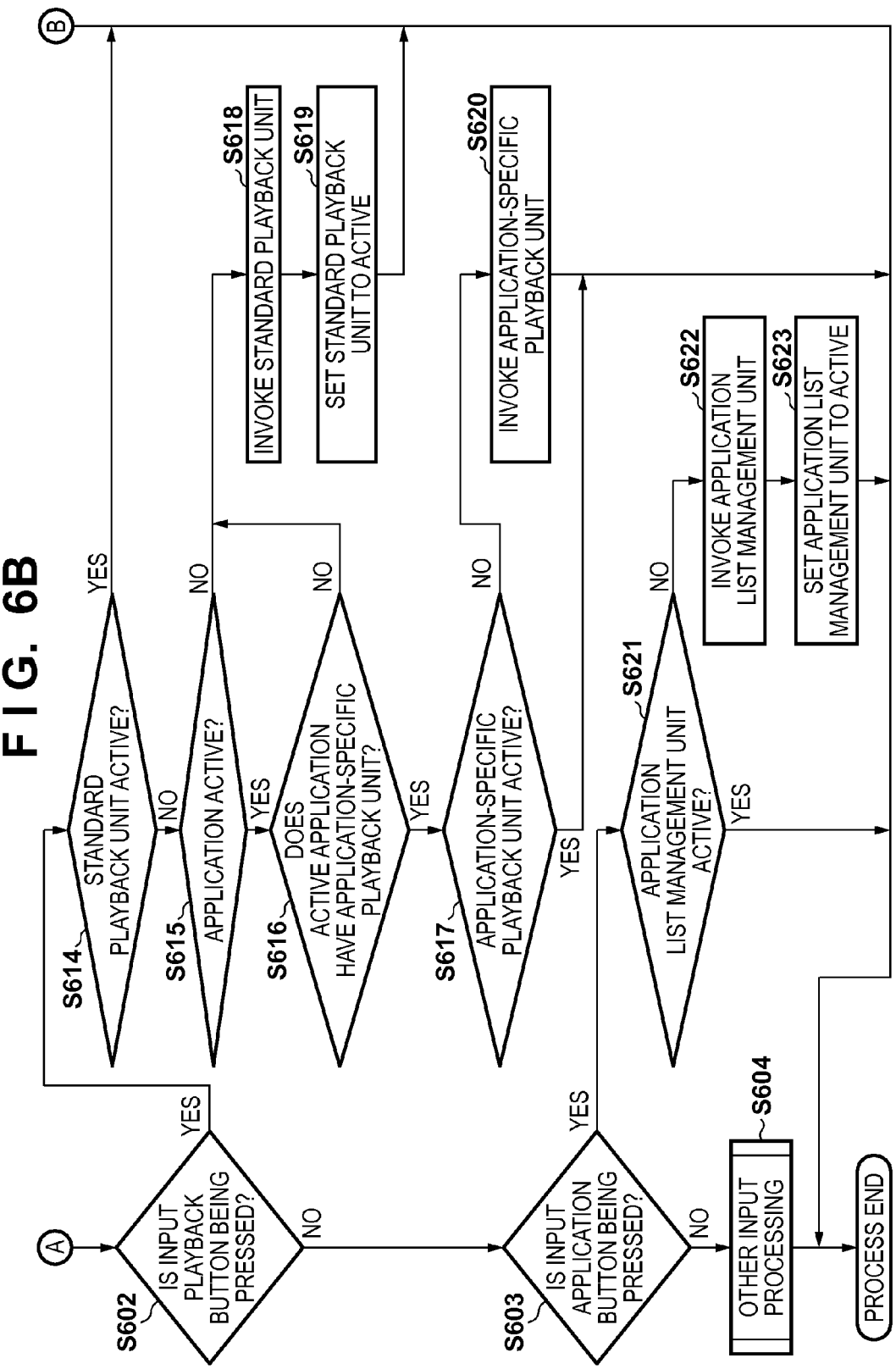

FIGS. 6A and 6B are flowcharts illustrating an example of an input process according to the present embodiment. This input process is executed by the CPU 102. First, the CPU 102 determines whether or not the input is a result of the release button 302 being pressed (S601). In the case where it has been determined that the input is not a result of the release button 302 being pressed (No in S601), the CPU 102 determines whether or not the input is a result of the playback button 303 being pressed (S602). In the case where it has been determined that the input is not a result of the playback button 303 being pressed (No in S602), the CPU 102 determines whether or not the input is a result of the application button 304 being pressed (S603). In the case where it has been determined that the input is not a result of the application button 304 being pressed (No in S603), the CPU 102 carries out other input processing (S604) and ends the process.

In the case where it has been determined that the input is a result of the release button 302 being pressed (Yes in S601), the CPU 102 determines whether or not the standard image capturing unit 207 of the image capturing apparatus is active based on the identifier held in the active application holding unit 213 (S605). In the case where the CPU 102 has determined that the standard image capturing unit 207 is active (Yes in S605), the standard image capturing unit 207 carries out an image capturing process (S613), after which the processing ends. In the case where it has been determined that the standard image capturing unit 207 is not active (No in S605), the CPU 102 determines whether or not a specific application is active by confirming the identifier held in the active application holding unit 213 (S606). Note that the "image capturing process" is a process for generating image data for recording.

In the case where it has been determined that a specific application is active (Yes in S606), the CPU 102 determines whether or not that application has the application-specific image capturing unit 205 by invoking the interface 521 for returning whether or not the image capturing function is present (S607). In the case where it has been determined that the application has the application-specific image capturing unit 205 (Yes in S607), the CPU 102 determines whether or not the application-specific image capturing unit 205 is active by invoking the interface 523 that returns whether or not the image capturing function is active (S608). In the case where the CPU 102 has determined that the application-specific image capturing unit 205 is active (Yes in S608), the application-specific image capturing unit 205 captures an image (S609), after which the processing ends. In the case where it has been determined that the application-specific image capturing unit 205 is not active (No in S608), the CPU 102 invokes the application-specific image capturing unit 205 using the interface 522 for invoking the image capturing function of the application (S610), after which the processing ends.

In the case where it is determined in S606 that the specific application is not active (No in S606), the CPU 102 invokes the standard image capturing unit 207 (S611). The CPU 102 then sets the identifier of the standard image capturing unit 207 in the active application holding unit 213 (S612), after which the processing ends. Also in the case where the CPU 102 has determined in S607 that the active application does not include the application-specific image capturing unit 205 (No in S607), the process moves to S611 for invoking the standard image capturing unit 207 in the same manner. Thus, as described thus far, a determination as to whether to execute the image capturing process is carried out through a single input operation.

In the case where it has been determined in S602 that the input is a result of the playback button 303 being pressed (Yes in S602), the CPU 102 determines whether or not the standard playback unit 210 of the image capturing apparatus is currently active by confirming the identifier held in the active application holding unit 213 (S614). In the case where it has been determined that the standard playback unit 210 is active (Yes in S614), the CPU 102 does nothing and the processing ends. In the case where it has been determined that the standard playback unit 210 is not active (No in S614), the CPU 102 determines whether or not a specific application is active by confirming the identifier held in the active application holding unit 213 (S615).

In the case where it has been determined that a specific application is active (Yes in S615), the CPU 102 determines whether or not that application has the application-specific playback unit 206 by invoking the interface 524 for returning whether or not the image playback function is present (S616). In the case where it has been determined that the application has the application-specific playback unit 206 (Yes in S616), the CPU 102 determines whether or not the application-specific playback unit 206 is active by invoking the interface 526 that returns whether or not the image playback function is active (S617). In the case where it has been determined that the application-specific playback unit 206 is active (Yes in S617), the CPU 102 does nothing and the processing ends. In the case where it has been determined that the application-specific playback unit 206 is not active (No in S617), the CPU 102 invokes the application-specific playback unit 206 through the interface 525 for invoking the image playback function of the application (S620), after which the processing ends.

In the case where it has been determined that the specific application is not active (No in S615), the CPU 102 invokes the standard playback unit 210 of the image capturing apparatus (S618). The CPU 102 then sets the identifier of the standard playback unit 210 in the active application holding unit 213 (S619), after which the processing ends. Even in the case where it has been determined in S616 that the active application does not include the application-specific playback unit 206 (No in S616), the process moves to S618 for invoking the standard playback unit 210 of the image capturing apparatus in the same manner. Thus, as described thus far, a determination as to whether to execute the image playback process is carried out through a single input operation.

In the case where it has been determined that the input is a result of the application button 304 being pressed (Yes in S603), the CPU 102 determines whether or not the application list management unit 202 is already active based on the identifier held in the active application holding unit 213 (S621). In the case where it has been determined that the application list management unit 202 is not active (No in S621), the CPU 102 invokes the application list management unit 202 (S622), sets the identifier of the application list management unit 202 in the active application holding unit 213 (S623), and ends the processing. In the case where it has been determined that the application list management unit 202 is already active (Yes in S621), the CPU 102 does nothing, and the processing ends.

Figure 7:
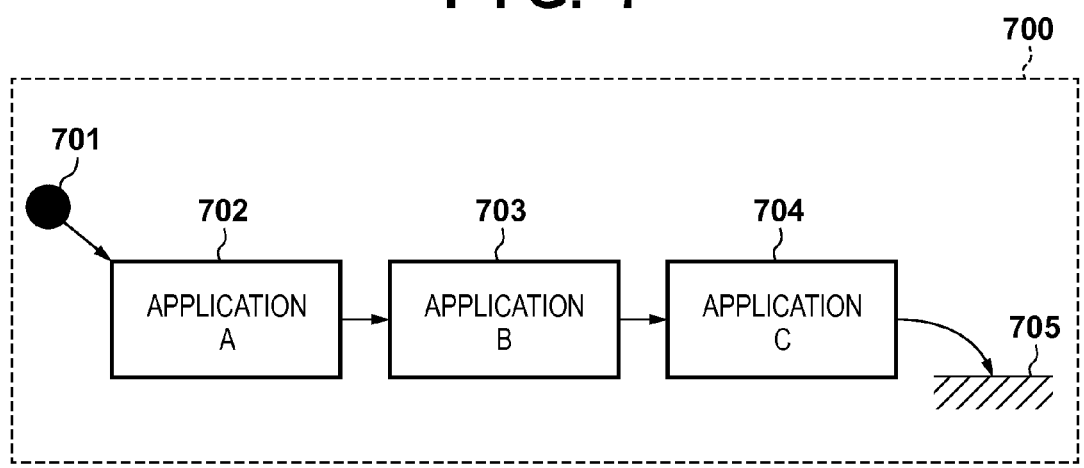
FIG. 7 is a conceptual diagram illustrating an example of a data structure that manages applications according to the embodiment.

FIG. 7 is a conceptual diagram illustrating an example of a data structure 700 that manages active applications according to the present embodiment. As illustrated in FIG. 7, data regarding active applications is in a list arranged in a single direction. The applications indicated by the respective pieces of data in the list are active, or in other words, the image capturing apparatus according to the present embodiment is capable of running multiple applications simultaneously. A pointer 701 is a pointer indicating the first active application data. Data 702, 703, and 704 each are data indicating a single active application. Each piece of data includes a pointer to an instance of the active individual application class 520 and a pointer to the next application data. In FIG. 7, the data 702 to 704 are arranged in launch order, and the first data is data indicating the application that was launched last. In other words, the data 704 indicates the data of the application that is launched first, and the data 702 indicates the data of the application that is launched last. A terminal 705 is a terminal of the list structure.

The application held in the active application holding unit 213 is managed by this data structure, but because this data structure is arranged in launch order, the position of the active application is not set. In the present embodiment, the following procedure is necessary to cycle through all of the running applications starting from the active application. That is, first, the data structure 700 that manages the active applications is cycled through to find the active application. Then, by cycling through the data structure 700 that manages the active applications, the applications that were launched prior thereto are cycled through sequentially, and the start of the data structure is returned to if the terminal 705 is reached. The data structure 700 that manages the active applications is then cycled through until the active application is reached again.

Figure 8:
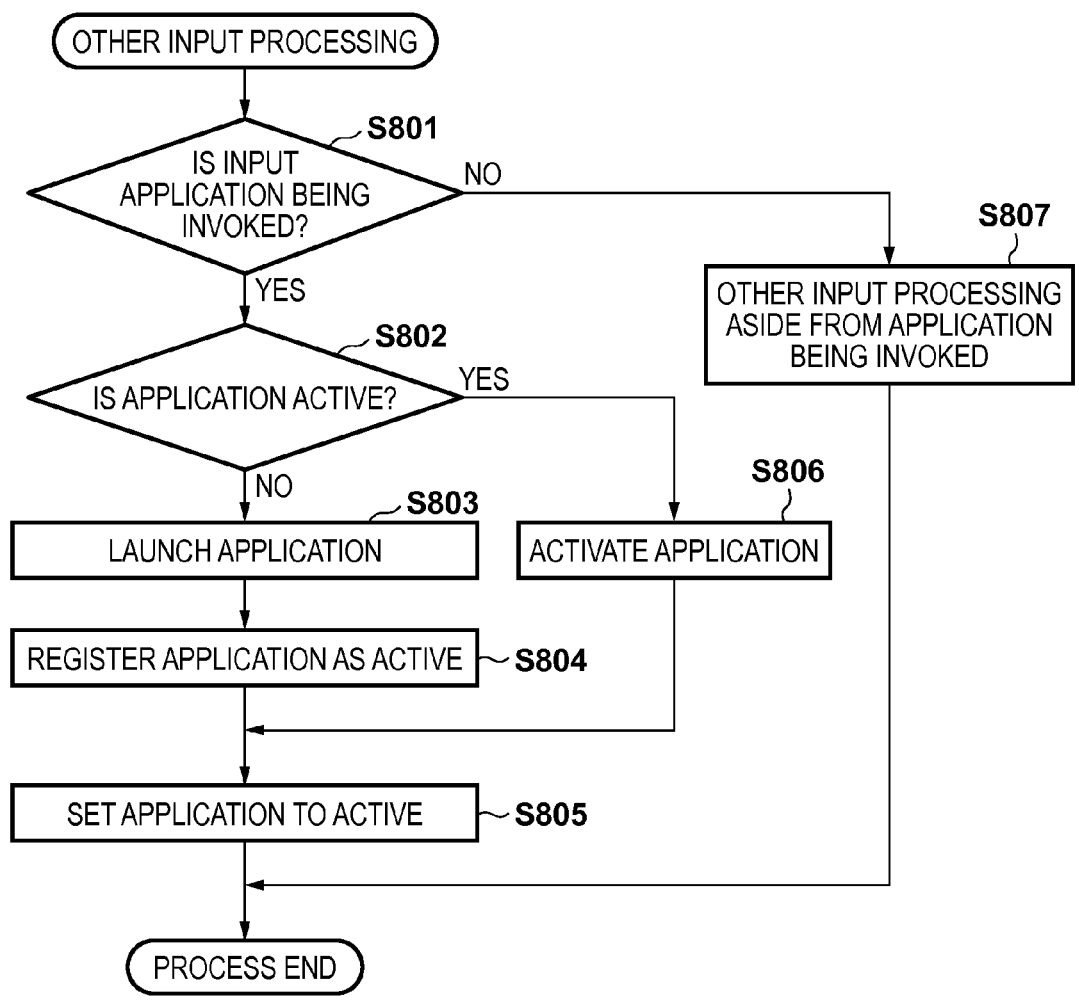
FIG. 8 is a flowchart illustrating another example of an input process according to the first embodiment.

FIG. 8 is a flowchart illustrating another example of an input process according to this embodiment. This input process is executed by the CPU 102. First, the CPU 102 determines whether or not the input is a result of an application being invoked (S801). In the case where it has been determined that the input is a result of an application being invoked (Yes in S801), the CPU 102 determines whether or not the application is active by searching through the data structure 700 that manages the active applications (S802). In the case where it has been determined that the application is not active (No in S802), the CPU 102 launches the application (S803) and adds data corresponding to that application to the data structure 700 that manages the active applications (S804). The CPU 102 then sets the identifier of that application in the active application holding unit 213 (S805), after which the processing ends. In the case where it has been determined that the application is already active (Yes in S802), the CPU 102 displays that application at the forefront of the display unit included in the output unit 107, and carries out a process for activating the application (S806). The process for activating the application is, for example, the application being subject to delivery of an input event from the input unit 106 or the like. In the data structure 700 that manages the active applications, the CPU 102 moves the data of that application to the position of the application that was invoked last (S806). The process then moves to S805. In the case where it has been determined that the input is not invoking the application (No in S801), the CPU 102 carries out input processing aside from that for an application being invoked (S807), after which the processing ends.

As described thus far, according to the present embodiment, in an image capturing apparatus in which multiple applications are installed, the respective applications can consistently invoke the image capturing function, the image playback function, and the application list function through a set operation. Furthermore, in the case where the active application includes the image capturing function, the image capturing function of the application can be invoked with the same operation as that for invoking the standard image capturing function of the image capturing apparatus. In addition, in the case where the active application includes the image playback function, the image playback function of the application can be invoked with the same operation as that for invoking the standard image playback function of the image capturing apparatus.

Second Embodiment

Figure 9:
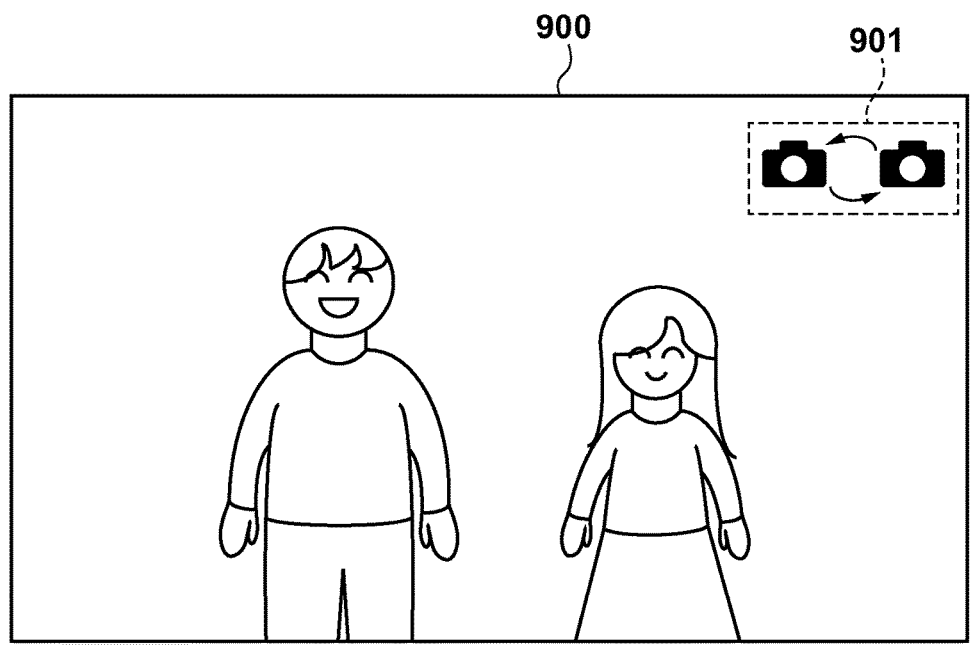
FIG. 9 is a conceptual diagram illustrating an example of an image capturing screen according to a second embodiment.

The present embodiment describes an example of switching between the standard image capturing function of the image capturing apparatus and a running application-specific image capturing function. FIG. 9 is a conceptual diagram illustrating an example of an image capturing screen according to the present embodiment. In an overall viewfinder screen 900 for capturing an image, displayed in the display unit 301, an image capturing unit switch button 901 is a button for switching the current image capturing function to another application-specific image capturing function or to the standard image capturing function. In the image capturing apparatus, as long as a viewfinder screen for capturing an image is displayed, the image capturing function can be switched by superimposing the image capturing unit switch button 901 regardless of which application generated the viewfinder screen. Although not shown, superimposing the same type of switch button in the image playback screen for playing back images makes it possible to switch to another application-specific image playback function or to the standard image playback function.

Figure 14A:
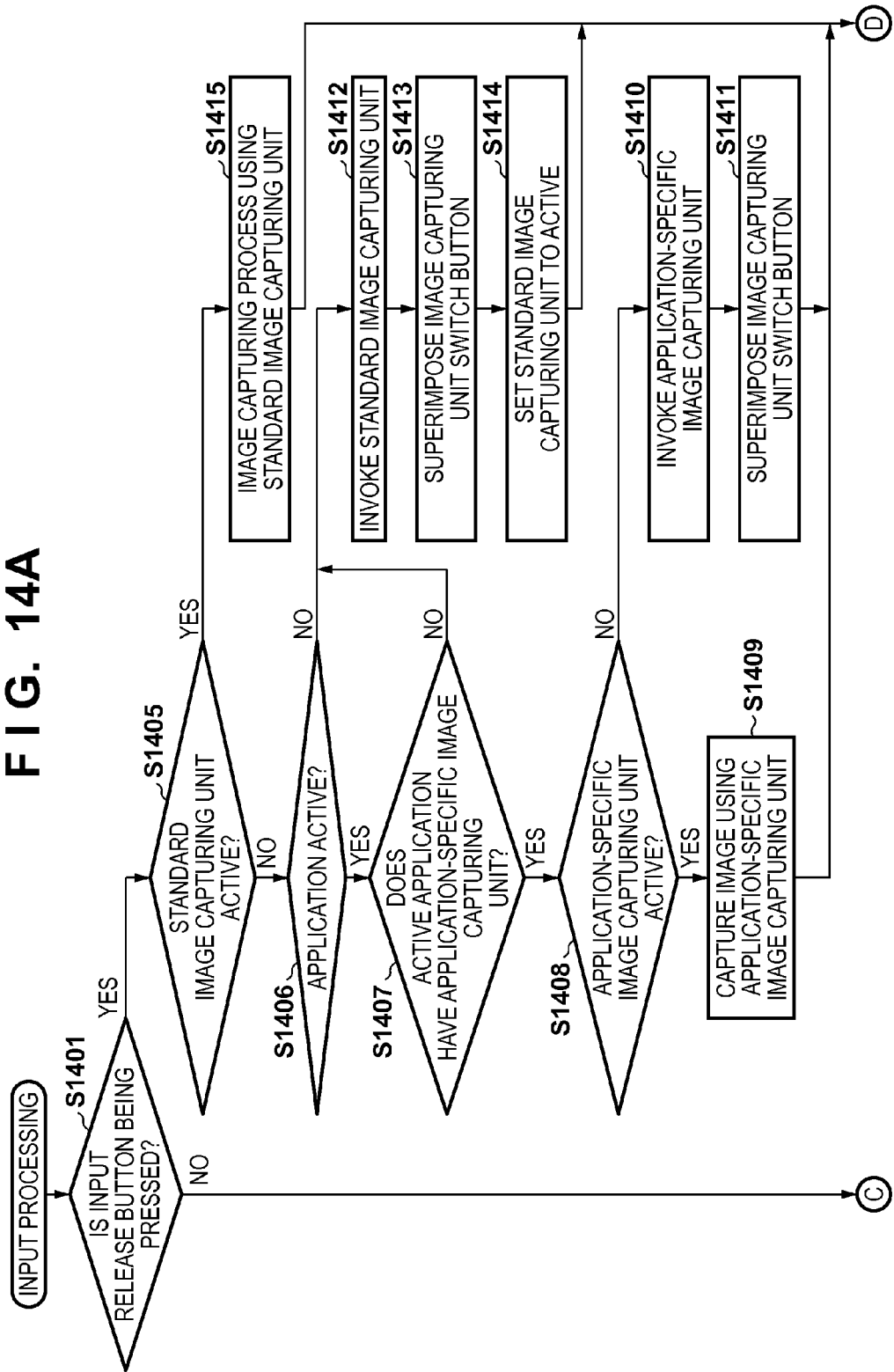

FIGS. 14A and 14B are flowcharts illustrating an example of an input process according to the present embodiment. This input process is executed by the CPU 102. First, the CPU 102 determines whether or not the input is a result of the release button 302 being pressed (S1401). In the case where it has been determined that the input is not a result of the release button 302 being pressed (No in S1401), the CPU 102 determines whether or not the input is a result of the playback button 303 being pressed (S1402). In the case where it has been determined that the input is not a result of the playback button 303 being pressed (No in S1402), the CPU 102 determines whether or not the input is a result of the application button 304 being pressed (S1403). In the case where it has been determined that the input is not a result of the application button 304 being pressed (No in S1403), the CPU 102 carries out other input processing (S1404) and ends the process.

In the case where it has been determined in S1401 that the input is a result of the release button 302 being pressed (Yes in S1401), the CPU 102 determines whether or not the standard image capturing unit 207 of the image capturing apparatus is active based on the identifier held in the active application holding unit 213 (S1405). In the case where the CPU 102 has determined that the standard image capturing unit 207 is active (Yes in S1405), the standard image capturing unit 207 carries out an image capturing process (S1415), after which the processing ends. In the case where it has been determined that the standard image capturing unit 207 is not active (No in S1405), the CPU 102 determines whether or not a specific application is active by confirming the identifier held in the active application holding unit 213 (S1406). In the case where it has been determined in S1406 that the specific application is active (Yes in S1406), the CPU 102 determines whether or not that application includes the application-specific image capturing unit 205 by invoking the interface 521 for returning whether or not the image capturing function is present (S1407).

In the case where it has been determined that the application-specific image capturing unit 205 is present (Yes in S1407), the CPU 102 determines whether or not the application-specific image capturing unit 205 is active by invoking the interface 523 that returns whether or not the image capturing function is active (S1408). In the case where the CPU 102 has determined that the application-specific image capturing unit 205 is active (Yes in S1408), the application-specific image capturing unit 205 captures an image (S1409), after which the processing ends. In the case where it has been determined in S1408 that the application-specific image capturing unit 205 is not active (No in S1408), the CPU 102 invokes the application-specific image capturing unit 205 using the interface 522 for invoking the image capturing function of the application (S1410). Thereafter, the CPU 102 superimposes the image capturing unit switch button 901 on the viewfinder screen (S1411), after which the processing ends.

In the case where it has been determined in S1406 that the specific application is not active (No in S1406), the CPU 102 invokes the standard image capturing unit 207 (S1412) and then superimposes the image capturing unit switch button 901 on the viewfinder screen (S1413). The CPU 102 then sets the identifier of the standard image capturing unit 207 in the active application holding unit 213 (S1414), after which the processing ends. Also in the case where the CPU 102 has determined in S1407 that the active application does not include the application-specific image capturing unit 205 (No in S1407), the process moves to S1412 for invoking the standard image capturing unit 207 in the same manner.

In the case where it has been determined in S1402 that the input is a result of the playback button 303 being pressed (Yes in S1402), the CPU 102 determines whether or not the standard playback unit 210 of the image capturing apparatus is currently active (S1416). In the case where it has been determined that the standard playback unit 210 is active (Yes in S1416), the CPU 102 does nothing and the processing ends. In the case where it has been determined in S1416 that the standard playback unit 210 is not active (No in S1416), the CPU 102 determines whether or not a specific application is active by confirming the identifier held in the active application holding unit 213 (S1417). In the case where it has been determined that the specific application is active (Yes in S1417), the CPU 102 determines whether or not that application has the application-specific playback unit 206 by invoking the interface 524 for returning whether or not the image playback function is present (S1418).

In the case where it has been determined that the application has the application-specific playback unit 206 (Yes in S1418), the CPU 102 determines whether or not the application-specific playback unit 206 is active by invoking the interface 526 that returns whether or not the image playback function is active (S1419). In the case where it has been determined that the application-specific playback unit 206 is active (Yes in S1419), the CPU 102 does nothing and the processing ends. In the case where it has been determined in S1419 that the application-specific playback unit 206 is not active (No in S1419), the CPU 102 invokes the application-specific playback unit 206 using the interface 525 for invoking the image playback function of the application (S1423). Thereafter, the CPU 102 superimposes an image playback unit switch button on the image playback screen (not shown) (S1424), after which the processing ends. In the case where it has been determined in S1417 that the specific application is not active, the CPU 102 invokes the standard playback unit 210 of the image capturing apparatus (S1420) and superimposes the image playback unit switch button on the image playback screen (not shown) (S1421). The CPU 102 then sets the identifier of the standard playback unit 210 in the active application holding unit 213 (S1422), after which the processing ends. Also in the case where the CPU 102 has determined in S1418 that the active application does not include the application-specific playback unit 206 (No in S1418), the process moves to S1420 for invoking the standard playback unit 210 of the image capturing apparatus in the same manner.

In the case where it has been determined in S1403 that the input is a result of the application button 304 being pressed, the CPU 102 determines whether or not the application list management unit 202 is already active based on the identifier held in the active application holding unit 213 (S1425). In the case where it has been determined that the application list management unit 202 is not active (No in S1425), the CPU 102 invokes the application list management unit 202 (S1426), sets the identifier of the application list management unit 202 in the active application holding unit 213 (S1427), and ends the processing. In the case where it has been determined in S1421 that the application list management unit 202 is already active (Yes in S1421), the CPU 102 does nothing, and the processing ends.

Figure 10:
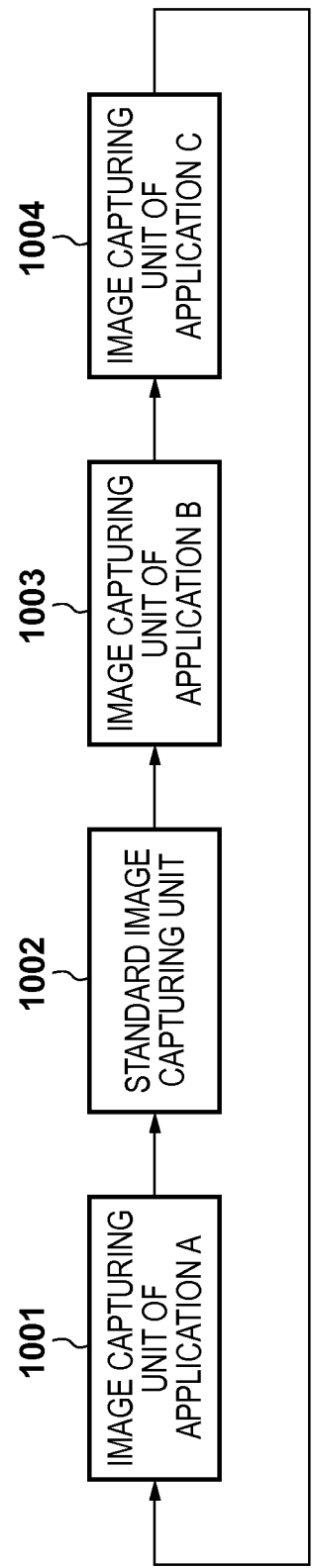
FIG. 10 is a conceptual diagram illustrating an example of a flow for switching image capturing means in an image capturing apparatus according to the second embodiment.

FIG. 10 is a conceptual diagram illustrating an example of a flow for switching image capturing functions in the image capturing apparatus according to the present embodiment. An image capturing unit 1001 of an application A, an image capturing unit 1003 of an application B, and an image capturing unit 1004 of an application C each correspond to image capturing functions of active applications A, B, and C. A standard image capturing unit 1002 is the standard image capturing function of the image capturing apparatus. FIG. 10 illustrates a state in which each time the user taps the image capturing unit switch button 901 in the screen, the multiple image capturing functions provided in the image capturing apparatus are switched between the standard image capturing function of the image capturing apparatus and the image capturing functions of the active applications. The image capturing unit 1001 of the application A is the image capturing function of the active application, and when the image capturing function switch is carried out while in the image capturing unit 1001 of the application A, the standard image capturing unit 1002 of the image capturing apparatus is invoked. It is assumed that in the image capturing apparatus according to the present embodiment, the standard image capturing function of the image capturing apparatus is always invoked when the image capturing function switch is carried out while in the image capturing function of the active application.

When the image capturing function switch is carried out while in the standard image capturing unit 1002, the image capturing unit 1003 of the application B, which has the image capturing function launched one place before the active application in the data structure 700 that manages the active applications, is invoked. When the image capturing function switch is carried out while in the image capturing unit 1003 of the application B, the image capturing unit 1004 of the application C, which has the image capturing function launched two places before in the data structure 700 that manages the active applications, is invoked. When the image capturing function switch is carried out during the image capturing unit 1004 of the application C, which is the final active application having an image capturing function, the image capturing unit 1001 of the application A, which is an active application, is invoked.

Figure 11:
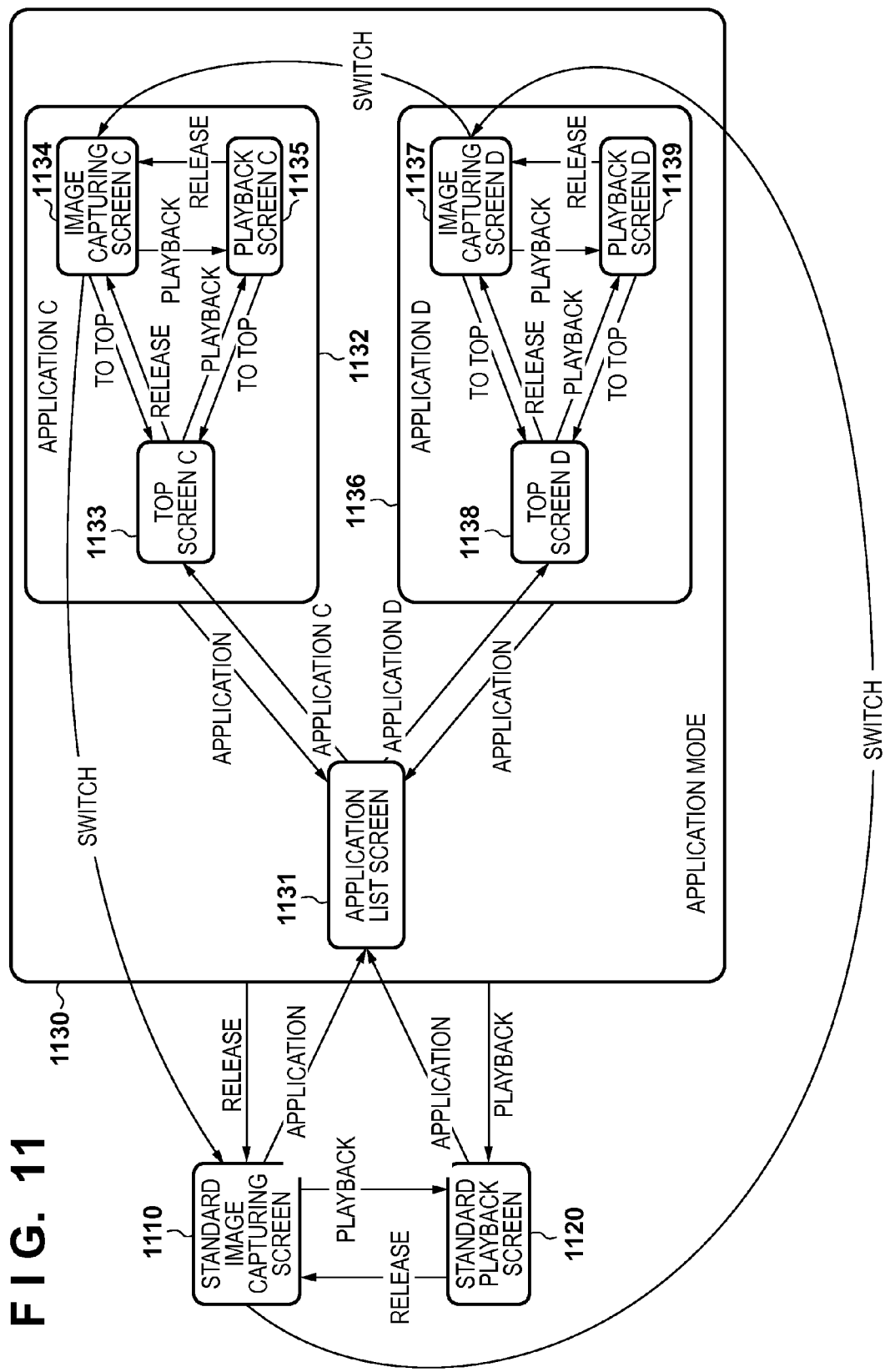
FIG. 11 is a conceptual diagram illustrating an example of a screen change chart of the image capturing apparatus according to the second embodiment.

FIG. 11 is a conceptual diagram illustrating an example of a screen change chart of the image capturing apparatus according to the present embodiment. A standard image capturing screen 1110 is a screen of the image capturing apparatus that includes the viewfinder image for capturing an image. A standard playback screen 1120 is a screen of the image capturing apparatus for playing back captured images. An application mode 1130 includes an application list screen 1131, an application C 1132, and an application D 1136. The application mode 1130 is not an actual screen, but is rather a conceptual presence that includes the application list screen and screens for the individual applications.

The application list screen 1131 is a screen that displays, in the display unit 301, a list of the applications 204 installed in the image capturing apparatus. The application list screen 1131 can, when the user taps any one of the listed applications, invoke the application that has been tapped. The application C 1132 is one application invoked from the application list, and although multiple screens are included therein, the screens are conceptual presences and do not indicate any specific screens. A top screen C 1133 is a top screen displayed when the application C 1132 is launched. An image capturing screen C 1134 is an image capturing screen in the application C 1132. A playback screen C 1135 is an image playback screen in the application C 1132. The application D 1136, as well as a top screen D 1138, an image capturing screen D 1137, and a playback screen D 1139 included in the application D 1136, are the same as the application C 1132, the top screen C 1133, the image capturing screen C 1134, and the playback screen C 1135, respectively.

When, in the standard image capturing screen 1110, the playback button 303 is pressed by the user, the screen changes to the standard playback screen 1120, and when the application button 304 is pressed by the user, the screen changes to the application list screen 1131. When, in the standard playback screen 1120, the release button 302 is pressed by the user, the screen changes to the standard image capturing screen 1110, and when the application button 304 is pressed by the user, the screen changes to the application list screen 1131. When, in any of the screens in the application mode 1130, the release button 302 is pressed by the user, the screen changes to the standard image capturing screen 1110, and when the playback button 303 is pressed by the user, the screen changes to the standard playback screen 1120. However, in the case where a screen change is indicated by a specific button in an individual screen, that indicated screen change is prioritized over the changes defined in the application mode.

When, in the application list screen 1131, the application C displayed in the display unit 301 is tapped by the user, the screen changes to the top screen C 1133. Likewise, when the application D is tapped, the screen changes to the top screen D 1138. On the other hand, when, in any screen in the application C 1132 and the application D 1136, the application button 304 is pressed by the user, the screen changes to the application list screen 1131. When, in the application C 1132, the release button 302 is pressed by the user, the screen changes to the image capturing screen C 1134, and when the playback button 303 is pressed, the screen changes to the playback screen C 1135. Meanwhile, when a button (not shown) in the display unit 301 is pressed by the user, the screen changes to the top screen C 1133 of the application C 1132. Likewise, when, in the application D 1136, the release button 302 is pressed by the user, the screen changes to the image capturing screen D 1137, and when the playback button 303 is pressed, the screen changes to the playback screen D 1139. When a button (not shown) in the display unit 301 is pressed, the screen changes to the top screen D 1138.

In FIG. 11, both the application C 1132 and the application D 1136 are running, and the currently active screen is the image capturing screen C 1134. At this time, when the image capturing unit switch button 901 displayed in the display unit 301 is tapped, the screen changes to the standard image capturing screen 1110 as illustrated in FIG. 11. Furthermore, when the image capturing unit switch button 901 is tapped in the standard image capturing screen 1110 of the image capturing apparatus after the change, the screen changes to the image capturing screen D 1137 as illustrated in FIG. 11. Finally, when the image capturing unit switch button 901 displayed in the display unit 301 is tapped in the image capturing screen D 1137, the screen returns to the image capturing screen C 1134 as illustrated in FIG. 11.

Figure 12:
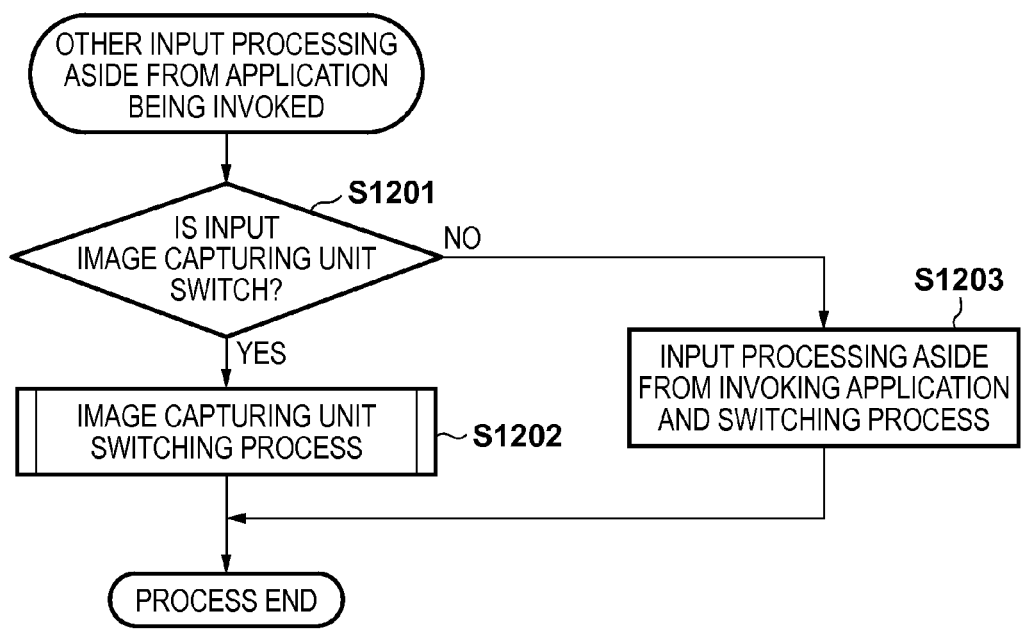
FIG. 12 is a flowchart illustrating another example of an input process according to the second embodiment.

FIG. 12 is a flowchart illustrating an example of another input process, aside from the invoking of an application, according to the present embodiment. This input process is executed by the CPU 102. First, the CPU 102 determines whether or not the input is an image capturing unit switch (S1201), and in the case where it has been determined that the input is an image capturing unit switch (Yes in S1201), an image capturing unit switching process is executed (S1202), after which the process ends. In the case where it has been determined that the input is not an image capturing unit switch (No in S1201), the CPU 102 executes an input process aside from the invoking of an application and the image capturing unit switching process (S1203), after which the process ends.

Figure 13:
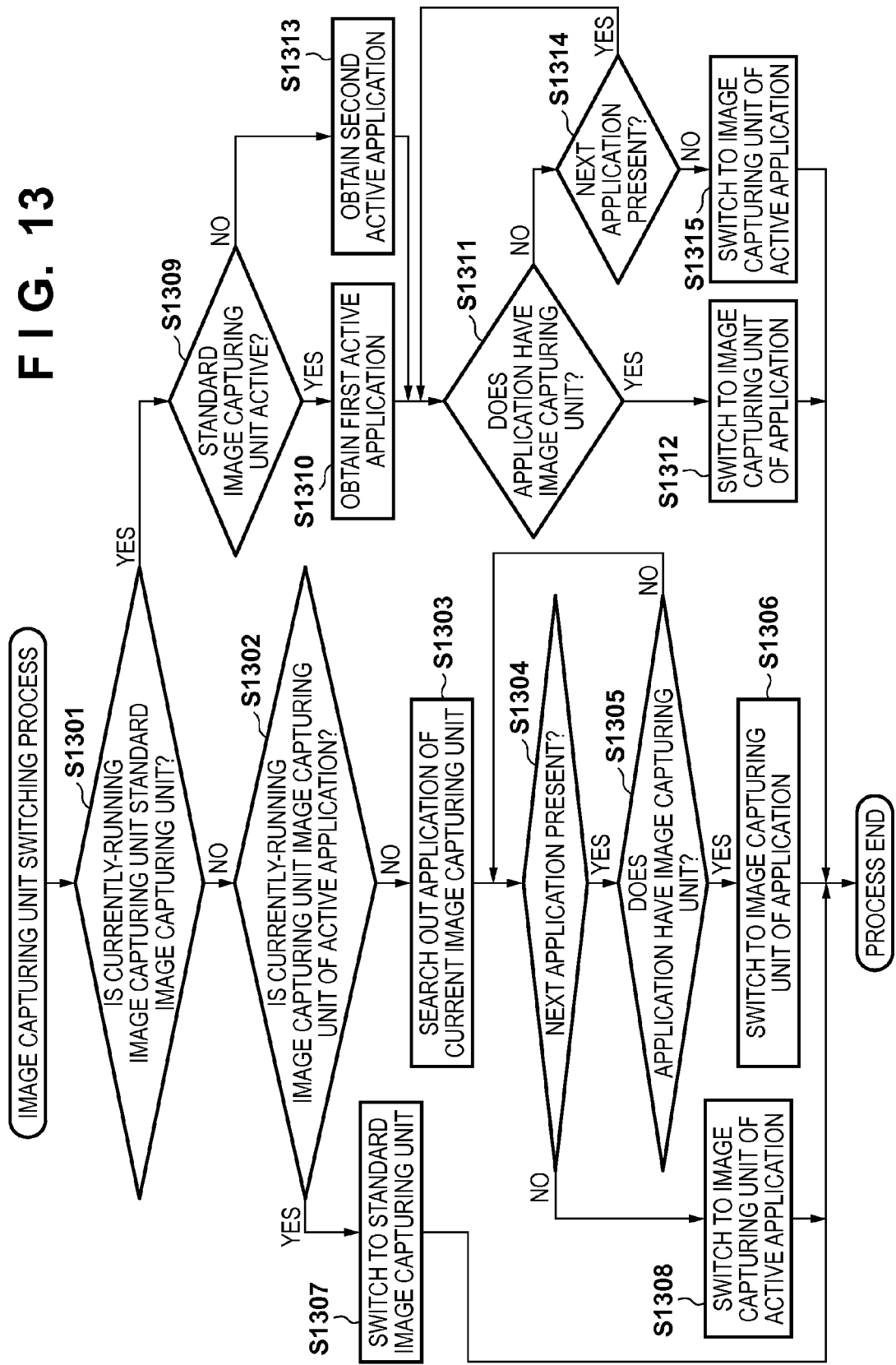
FIG. 13 is a flowchart illustrating an example of a process for switching image capturing means according to the second embodiment.

FIG. 13 is a flowchart illustrating an example of the image capturing unit switching process according to the present embodiment. This input process is executed by the CPU 102. First, the CPU 102 determines whether or not the standard image capturing unit 207 is the image capturing unit currently running (S1301). In the case where it has been determined that the standard image capturing unit 207 is not the image capturing unit currently running (No in S1301), the CPU 102 determines whether or not the image capturing unit currently running is the application-specific image capturing unit 205 of the active application (S1302). In the case where it has been determined that the image capturing unit currently running is not the application-specific image capturing unit 205 of the active application (No in S1302), the CPU 102 searches for the image capturing unit currently running by cycling through the data structure 700 that manages the active applications (FIG. 7) (S1303). Then, the CPU 102 determines whether or not data of a next application connected to the data of the application that includes the currently-running image capturing unit is present in the data structure 700 that manages the active applications (S1304).

In the case where it has been determined in S1304 that data of the next application is present (Yes in S1304), the CPU 102 determines whether or not the next application includes the application-specific image capturing unit 205 by invoking the interface 521 for returning whether or not the application of that application class includes the image capturing function (S1305). In the case where it has been determined that the application includes the application-specific image capturing unit 205 (Yes in S1305), the CPU 102 carries out the process for switching to the application-specific image capturing unit 205 of that application (S1306), after which the processing ends. In the case where the CPU 102 has determined that the next application does not include the application-specific image capturing unit 205 (No in S1305), the process returns to the determination in S1304. In the case where it has been determined in S1302 that the currently-running image capturing unit is the application-specific image capturing unit 205 of the active application (Yes in S1302), the CPU 102 carries out the process for switching to the standard image capturing unit 207 (S1307), after which the processing ends. In the case where it has been determined in S1304 that data of the next application is not present (No in S1304), the CPU 102 obtains the currently-active application from the active application holding unit 213 and invokes the image capturing function of that application. The process for switching to the application-specific image capturing unit 205 of the application is carried out as a result (S1308), after which the processing ends.

In the case where it has been determined in S1301 that the standard image capturing unit 207 is the image capturing unit currently running (Yes in S1301), the CPU 102 determines whether or not the standard image capturing unit 207 is the active application held in the active application holding unit 213 (S1309). In the case where it has been determined that the standard image capturing unit 207 is the active application (Yes in S1309), the CPU 102 obtains the data of the first application in the data structure 700 that manages the active applications (FIG. 7) as the image capturing function (S1310). In the case where it has been determined in S1309 that the standard image capturing unit 207 is not the active application (No in S1309), the CPU 102 obtains the second application from the beginning of the data structure 700 that manages the active applications as the image capturing function (S1313).

Next, the CPU 102 determines whether or not the obtained application has the application-specific image capturing unit 205 (S1311). In the case where it has been determined that the application includes the application-specific image capturing unit 205 (Yes in S1311), the CPU 102 carries out the process for switching to the application-specific image capturing unit 205 (S1312), after which the processing ends. In the case where it has been determined in S1311 that the obtained application does not have the application-specific image capturing unit 205 (No in S1311), the CPU 102 determines whether or not data of the next application is present after the data of the obtained application in the data structure 700 that manages the active applications (FIG. 7) (S1314). In the case where it has been determined that the data of the next application is present after the data of the obtained application (Yes in S1314), the CPU 102 obtains that next application, after which the processing moves to S1311. In the case where it has been determined that the data of the next application is not present after the data of the obtained application (No in S1314), the CPU 102 obtains the currently-active application from the active application holding unit 213 and invokes the application-specific image capturing unit 205 of that application. The process for switching to the application-specific image capturing unit 205 of the application is carried out as a result (S1315), after which the processing ends.

Although the present embodiment describes the associations between applications and image capturing functions as the image capturing functions being included in the applications, it should be noted that the associations may be realized by referring to image capturing functions that are independent from the applications. The associations may also be realized as a table that associates applications with image capturing functions that are independent from the applications. In addition, although the present embodiment describes the standard image capturing function of the image capturing apparatus and the image capturing function of the active application as being subject to switching, the standard image capturing function of the image capturing apparatus and the image capturing functions of all of the applications that have image capturing functions installed in the image capturing apparatus may be subject to the switching. It is also possible for only the standard image capturing function of the image capturing apparatus and the image capturing function of the active application to be subject to the switching. With respect to the image playback functions, the standard image playback function of the image capturing apparatus and the image playback function of the active application can be switched in the same manner.

According to the embodiment described thus far, it is easy to switch between the standard image capturing function of the image capturing apparatus and the image capturing function of an application installed in the image capturing apparatus. In other words, according to the embodiment described thus far, image capturing functions/playback functions can always be invoked through the same function. In addition, the appropriate image capturing function/playback function can be invoked in accordance with the user's usage state, even with the same invoking function. Further still, it is possible to switch to the image capturing function/playback function of another application installed in the image capturing apparatus while one image capturing function/ playback function is currently running.

Other Embodiments

Although exemplary embodiments have been described in detail above, the present invention can also be carried out as a system, apparatus, method, program, recording medium (storage medium), and so on. Specifically, the present invention may be applied to a system configured of multiple devices (for example, a host computer, an interface device, an image capturing device, a web-based application, or the like) or to an apparatus configured of a single device.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075724, filed Apr. 1, 2014 which is hereby incorporated by reference herein in its entirety.

What is claimed is:

1. An image capturing apparatus comprising:
a release member;
one or more processors; and
one or more memories coupled to the one or more processors, the one or more memories having instructions stored thereon which, when executed by the one or more processors, cause the image capturing apparatus to:
capture an image using one of a plurality of image capturing functions which include a particular application-specific image capturing function;
detect whether the release member is operated;
determine whether a particular application for the particular application-specific image capturing function is active;
determine whether the particular application-specific image capturing function is invoked in a case where it is determined that the particular application is active; and
display an image capturing screen of the particular application-specific capturing function in the case where an operation of the release member is detected and it is determined that the particular application-specific image capturing function is not invoked.

2. The image capturing apparatus according to claim 1, wherein the one or more memories include further instructions stored thereon which, when executed by the one or more processors, cause the image capturing apparatus to:
carry out an image capturing process using the particular application-specific image capturing function in the case where an operation of the release member is detected and it is determined that the particular application-specific image capturing function is invoked.

3. The image capturing apparatus according to claim 1, further comprising:
a playback button,
wherein the one or more memories include further instructions stored thereon which, when executed by the one or more processors, cause the image capturing apparatus to:
play back a captured image using one of a plurality of playback functions according to the image capturing function used to capture the captured image; and
display a playback screen for performing playback using the playback function according to the image capturing screen being displayed when an operation of the playback button is detected.

4. The image capturing apparatus according to claim 1, wherein the one or more memories include further instructions stored thereon which, when executed by the one or more processors, cause the image capturing apparatus to:
play back a captured image using one of a plurality of playback functions according to the image capturing function used to capture the captured image, and
display the image capturing screen according to the playback function in the case where an operation of the release member is detected while a predetermined playback screen for playback is being displayed.

5. The image capturing apparatus according to claim 1, wherein the one or more memories include further instructions stored thereon which, when executed by the one or more processors, cause the image capturing apparatus to:
determine an active application when an operation of the release member is detected, and
display an image capturing screen corresponding to a standard image capturing function in the case where an operation of the release member is detected and it is determined that the particular application is not active.

6. The image capturing apparatus according to claim 1, wherein the one or more memories include further instructions stored thereon which, when executed by the one or more processors, cause the image capturing apparatus to:
display a predetermined image capturing screen in the case where an operation of the release member is detected while an application list screen that displays a list of usable applications to a user is being displayed.

7. The image capturing apparatus according to claim 1, wherein the image capturing apparatus can use a plurality of applications, and
wherein the one or more memories include further instructions stored thereon which, when executed by the one or more processors, cause the image capturing apparatus to: display the image capturing screen for each of the plurality of applications.

8. The image capturing apparatus according to claim 1, wherein the one or more memories further include an application installed after the apparatus has been manufactured and shipped.

9. The image capturing apparatus according to claim 1, wherein the one or more memories include further instructions stored thereon which, when executed by the one or more processors, cause the image capturing apparatus to:
   display a function switching button on the image capturing screen by the image capturing function which is determined as active; and
   switch the active image capturing function to another image capturing function if an operation of the function switching button is detected.

10. The image capturing apparatus according to claim 1, wherein the one or more memories include further instructions stored thereon which, when executed by the one or more processors, cause the image capturing apparatus to:
   display a standard playback screen in the case where a predetermined input operation that is different from an operation of the release member is received while a predetermined image capturing screen is being displayed.

11. The image capturing apparatus according to claim 1, wherein the plurality of image capturing functions are functions installed at the time of product shipment.

12. A control method for an image capturing apparatus including a release member and configured to capture an image using one of a plurality of image capturing functions which include a particular application-specific image capturing function, the method comprising:
   detecting whether the release member is operated;
   determining whether a particular application for the particular application-specific image capturing function is active;
   determining whether the particular application-specific image capturing function is invoked in a case where it is determined that the particular application is active; and
   displaying an image capturing screen of the particular application-specific capturing function in the case where an operation of the release member is detected and it is determined that the particular application-specific image capturing function is not invoked.

13. A non-transitory computer-readable storage medium storing a computer program for controlling a computer to execute a control method for an image capturing apparatus including a release member and configured to capture an image using one of a plurality of image capturing functions which include a particular application-specific image capturing function, the method comprising:
   detecting whether the release member is operated;
   determining whether a particular application for the particular application-specific image capturing function is active;
   determining whether the particular application-specific image capturing function is invoked in a case where it is determined that the particular application is active; and
   displaying an image capturing screen of the particular application-specific capturing function in the case where an operation of the release member is detected and it is determined that the particular application-specific image capturing function is not invoked.

* * * * *